US009591555B2

United States Patent
Calcev et al.

(10) Patent No.: US 9,591,555 B2
(45) Date of Patent: *Mar. 7, 2017

(54) SYSTEM AND METHOD FOR ADAPTIVE ACCESS NETWORK QUERY PROTOCOL (ANQP) ELEMENT PROVISIONING

(71) Applicant: Futurewei Technologies, Inc., Plano, TX (US)

(72) Inventors: George Calcev, Hoffman Estates, IL (US); Lin Cai, Hoffman Estates, IL (US); Xingxin Zhang, Chengdu (CN)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/976,849

(22) Filed: Dec. 21, 2015

(65) Prior Publication Data

US 2016/0112933 A1    Apr. 21, 2016

Related U.S. Application Data

(63) Continuation of application No. 13/786,081, filed on Mar. 5, 2013, now Pat. No. 9,277,495.

(51) Int. Cl.
| | |
|---|---|
| *H04L 12/28* | (2006.01) |
| *H04W 48/10* | (2009.01) |
| *H04W 48/20* | (2009.01) |
| *H04W 48/14* | (2009.01) |
| *H04L 12/18* | (2006.01) |

(52) U.S. Cl.
CPC ........... *H04W 48/10* (2013.01); *H04W 48/14* (2013.01); *H04W 48/20* (2013.01); *H04L 12/189* (2013.01)

(58) Field of Classification Search
CPC ...... H04W 48/12; H04W 48/14; H04W 48/16
See application file for complete search history.

(56) References Cited

U.S. PATENT DOCUMENTS

| | | | | |
|---|---|---|---|---|
| 2011/0280228 A1* | 11/2011 | McCann | ............... | H04W 48/14 370/338 |
| 2012/0165056 A1* | 6/2012 | Kim | ...................... | H04W 16/14 455/509 |
| 2012/0281609 A1 | 11/2012 | Kasslin et al. | | |
| 2013/0012260 A1 | 1/2013 | Salkintzis et al. | | |

(Continued)

FOREIGN PATENT DOCUMENTS

| | | |
|---|---|---|
| GB | 2491226 | 11/2012 |
| WO | 2010011062 A2 | 1/2010 |
| WO | 2011115449 | 9/2011 |

OTHER PUBLICATIONS

Calcev, et al., "Modification to the Amendment Text of adaptive ANQP element provisioning in the beacon," IEEE 802.11-13/0038-01, Jan. 2013, 6 pages.

(Continued)

*Primary Examiner* — Shaq Taha
(74) *Attorney, Agent, or Firm* — Slater Matsil, LLP

(57) ABSTRACT

A method embodiment includes receiving, by an access point (AP), a request for an access network query protocol (ANQP) element, and multicasting the ANQP element as an ANQP information element (IE), wherein the ANQP IE is configured in accordance with a format transmittable by the AP in a multicast.

19 Claims, 3 Drawing Sheets

(56) References Cited

U.S. PATENT DOCUMENTS

| | | |
|---|---|---|
| 2013/0176897 A1 | 7/2013 | Wang et al. |
| 2013/0316705 A1 | 11/2013 | Kneckt et al. |
| 2014/0092779 A1 | 4/2014 | Seok et al. |
| 2014/0126563 A1* | 5/2014 | Chen .................... H04W 48/14 370/338 |
| 2014/0185598 A1 | 7/2014 | Canpolat et al. |
| 2014/0341072 A1* | 11/2014 | Cai ....................... H04W 48/14 370/254 |

OTHER PUBLICATIONS

Calcev, et al., "Text of ANQP element provisioning," IEEE 802.11-12/xxxxr0, Mar. 2013, 4 pages.
George Calcev et al, "Modification to the Amendment Text of adaptive ANQP element provisioning in the beacon," V1, IEEE 802.11-12/0038-00, Jan. 2013; pp. 1-5.
George Calcev et al, "Modification to the Amendment Text of adaptive ANQP element provisioning in the beacon," V2, IEEE 802.11-12/0038-01, Jan. 2013; pp. 1-5.
George Calcev et al, "Text of ANQP element provisioning," IEEE 802.11-12/0038-02, Jan. 2013; pp. 1-3.
Huawei Technologies, Inc., "International Search Report and Written Opinion" issued in International Application No. PCT/CN2014/072904 date of mailing: Jun. 16, 2014, 13 pages.

* cited by examiner

TABLE 8-184 - ANQP-ELEMENT DEFINITIONS

| ANQP-ELEMENT NAME | INFO ID | ABQP-ELEMENT (SUBCLAUSE) |
|---|---|---|
| RESERVED | 0-255 | N/A |
| QUERY LIST | 256 | 8.4.4.1 |
| CAPABILITY LIST | 257 | 8.4.4.2 |
| VENUE NAME | 258 | 8.4.4.3 |
| EMERGENCY CALL NUMBER | 259 | 8.4.4.4 |
| NETWORK AUTHENTICATION TYPE | 260 | 8.4.4.5 |
| ROAMING CONSORTIUM | 261 | 8.4.4.6 |
| IP ADDRESS TYPE AVAILABILITY | 262 | 8.4.4.8 |
| NAI REALM | 263 | 8.4.4.9 |
| 3GPP CELLULAR NETWORK | 264 | 8.4.4.10 |
| AP GEOSPATIAL LOCATION | 265 | 8.4.4.11 |
| AP CIVIC LOCATION | 266 | 8.4.4.12 |
| AP LOCATION PUBLIC IDENTIFIER URI | 267 | 8.4.4.13 |
| DOMAIN NAME | 268 | 8.4.4.14 |
| EMERGENCY ALERT IDENTIFIER URI | 269 | 8.4.4.15 |
| TLDS CAPABILITY | 270 | 8.4.4.17 |

FIG. 4

SYSTEM AND METHOD FOR ADAPTIVE ACCESS NETWORK QUERY PROTOCOL (ANQP) ELEMENT PROVISIONING

This application is a continuation of U.S. patent application Ser. No. 13/786,081, entitled "System and Method for Adaptive Access Network Query Protocol (ANQP) Element Provisioning," filed on Mar. 5, 2013, which application is incorporated herein by reference.

TECHNICAL FIELD

The present invention relates generally to a system and method for wireless communications, and, in particular embodiments, to a system and method for adaptive access network query protocol (ANQP) element provisioning.

BACKGROUND

Generally, known wireless standards, such as Institute of Electrical Engineering (IEEE) 802.11 or Hotspot 2.0, provide mechanisms for access networks (e.g., access points (APs)) to communicate information to a station (STA) prior to association. The mechanisms include a generic advertisement service (GAS) protocol, beacons, and a probe request/response framework. These mechanisms may be used to provide an unassociated STA with necessary information, so that the STA may select an appropriate wireless network.

SUMMARY OF THE INVENTION

These and other problems are generally solved or circumvented, and technical advantages are generally achieved, by preferred embodiments of the present invention which includes adaptive network query protocol (ANQP) element provisioning in WiFi beacons.

In accordance with an embodiment, a method for adaptive network query protocol (ANQP) signaling includes receiving, by an access point (AP), a request for an ANQP element, and multicasting the ANQP element as an ANQP information element (IE), wherein the ANQP IE is configured in accordance with a format transmittable by the AP in a multicast.

In accordance with another embodiment, an access point (AP) includes a processor, and a computer readable storage medium storing programming for execution by the processor, the programming including instructions to receive a request for adaptive network query protocol (ANQP) information, format at least a portion of the ANQP information as one or more ANQP information elements (IEs), wherein the ANQP IEs are configured in a format in accordance with a standard, and include the one or more ANQP IEs in a multicast.

In accordance with another embodiment, a station (STA) includes a processor, and a computer readable storage medium storing programming for execution by the processor, the programming including instructions to transmit a request for access network query protocol (ANQP) information, and receive at least a portion of the requested ANQP information as one or more ANQP information elements (IEs) in a multicast.

In accordance with yet another embodiment, a method for access network query protocol (ANQP) signaling includes transmitting, by a station (STA), a request for ANQP information using a generic advertisement service (GAS) protocol of an access point, and receiving at least a portion of the requested ANQP information as one or more ANQP information elements (IEs) in a beacon broadcast.

BRIEF DESCRIPTION OF THE DRAWINGS

For a more complete understanding of the present invention, and the advantages thereof, reference is now made to the following descriptions taken in conjunction with the accompanying drawing, in which:

FIG. 4 is a table of ANQP Info IDs in accordance with a relevant standard;

DETAILED DESCRIPTION OF ILLUSTRATIVE EMBODIMENTS

The making and using of embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
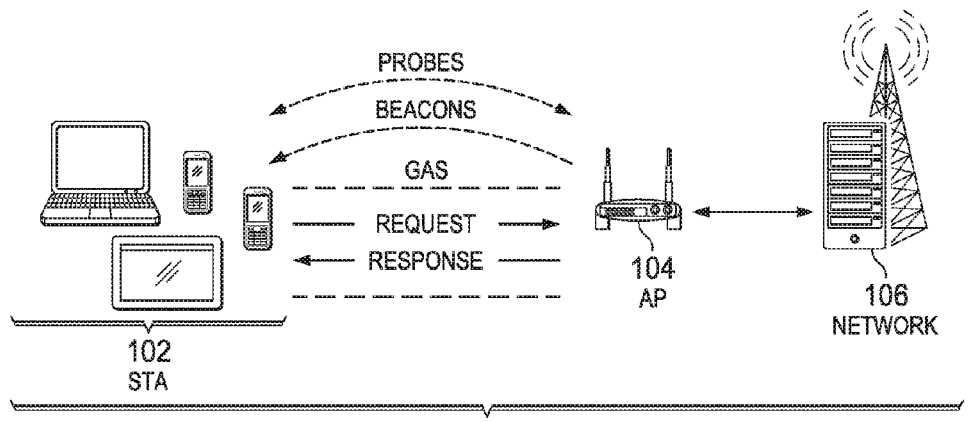
FIG. 1 is a block diagram of a station (STA) and access point (AP) communication mechanisms as are known in the art.

Various embodiments are described in a specific context, namely access network query Protocol (ANQP) element provisioning. Various embodiments may also be applied, however, to other Wi-Fi transmission frameworks, such as a Wi-Fi probe query/response framework FIG. 1 illustrates typical station (STA) and Wi-Fi network connection operation as is known in the art according to various standards, for example, Hotspot 2.0, IEEE 802.11 and the like. When a STA 102 decides to connect to a wireless network (e.g., WiFi), the UE first scans for available access points (AP), such as AP 104. AP 104 serves as a connection point between STA 102 and a network 106 (e.g., a wireless local area network (WLAN) in a fixed network or a wide area network (WAN)). Available APs may be connected to the same or multiple different networks, wherein each AP serves as a connection point to a single network. IEEE 802.11 allows for the discovery of and information gathering from suitable APs using several different mechanisms including, for example, a generic advertisement service (GAS) protocol, beacons, and probes.

A GAS protocol is a unicast query/response protocol that provides layer 2 transport of information between STA 102 and AP 104 prior to association. GAS allows unassociated UEs to determine the availability of and general information regarding a particular AP through the advertisement of certain information, such as, network 106's type (e.g., private, public, for-fee, etc.), operator identity, location, roaming consortium, venue information, and the like. Specifically, the GAS protocol allows STA 102 to obtain this information as access network query protocol (ANQP) elements.

Figure 2:
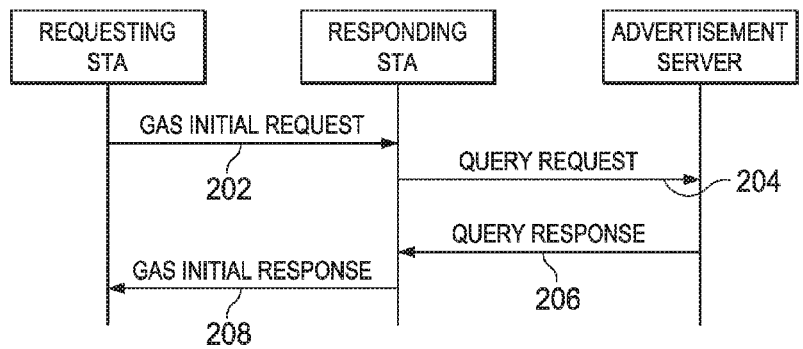
FIG. 2 is a block diagram of a generic advertisement service (GAS) protocol.

FIG. 2 illustrates a flow diagram of a typical GAS query/response protocol. In step 202, a requesting STA (e.g., STA 102) transmits a GAS initial request frame to a responding STA (e.g., AP 104). The GAS initial request frame allows the requesting STA to request specific types of information (e.g., STA location, capabilities, operator identity, and the like). The types of information a STA may request is generally defined by a standard (e.g., IEEE 802.11 defines this information in Table 8-184). In steps 204 and 206, the responding STA pulls the requested information from an appropriate server (e.g., an advertisement server). The information pulled is in the form of ANQP elements. In step 208, the responding STA then sends the requested information (i.e., the ANQP elements) to the requesting STA in a GAS initial response frame. Both the GAS initial request and initial response frames are unicast, public action frames.

When multiple STAs (e.g., in high density scenarios such as a mass transit hubs or event stadiums) try to discover and select wireless networks, multiple GAS exchanges are required. This is due to the GAS protocol being a unicast protocol. Therefore, the GAS procedure requires multiple request/reply protocol to relay information to multiple STAs, which, in high density scenarios, may lead to overload and delays both in the air-interface and the backhaul of a network.

Furthermore, many of these GAS exchanges may carry the same ANQP elements (e.g., operator identity or location of an AP). Therefore, network overhead may be conserved by routing some commonly-requested information carried by GAS request/response protocol to an AP's multicast protocol. For example, an AP's beacon is a multicast protocol that allows an AP to broadcast information. Any STA in an AP's coverage area may simply read information off the beacon without a query/response procedure. Additionally, an AP may also send multicast transmissions through a probe query/response protocol. A probe query/response protocol differs from GAS in that it allows for a responding AP to multicast a response to multiple requesting STAs.

In various embodiments, an AP (e.g., AP 104) may cache some commonly-requested ANQP elements locally and multicast the requested information. For instance, if an AP determines the number of requests for certain ANQP elements in a certain timeframe is above a threshold, the AP may cache the information in the ANQP element and multicast the information in a beacon broadcast. Generally, an AP multicasts information elements (IEs) in a particular format that is distinct from the format of ANQP elements sent via GAS. Therefore, various networks, STAs, and/or standards may be reconfigured to include the capability of transmitting and/or receiving ANQP IEs in a multicast. This eliminates the need for the AP to continually pull ANQP elements from the server and unicasting the ANQP elements to each requesting STA via GAS. The timeframe and threshold used to trigger multicasts are configurable parameters set by a network and/or in standard.

The information may be multicasted in a beacon broadcast or probe response/query protocol for a configurable period of time. For example, the configurable period of time may be specified in a configuration timer corresponding to a particular ANQP IE or group of ANQP IEs set by a standard. During that time, the multicast may include an indicator pointing to the availability of this ANQP information. When the timer expires, the information is removed from the beacon, and the AP may resume providing the information GAS messaging. The inclusion of a configuration timer ensures that the multicasted information is fresh and relevant (e.g., resources aren't being expended to transmit information in the beacon that is no longer being requested). The AP may continue to monitor the number of GAS requests for the specific information and decide if the information should be placed back in the beacon. For instance, the AP may monitor the number and type of ANQP information requested using packet inspection of the GAS messages and GAS response from the information server. Each ANQP IE may have different timers and may be removed or added in the beacon at different times and/or for different durations. The server may also monitor and indicate the ANQP information that should be multicasted by the AP.

In an alternative embodiment, ANQP information may be removed from a multicast (e.g., the beacon) in accordance with on other considerations as well as a timer. For example, low traffic, low number of associated STAs, time of the day, operator policy, or a combination of thereof may play a role in an AP's decision to remove ANQP information from its beacon.

In various embodiments, an AP may respond in a number of ways to an STA GAS initial request. For example, the AP may determine that all the information requested in a GAS initial request from a STA is broadcasted in its beacon. The AP may not respond to the STA and rely on the STA to read the information from its beacon. Alternatively, the AP may signal to the STA that the information requested is in the beacon. In another example, the AP may determine that only a subset of the information requested by a STA is in the beacon. The AP may send a GAS initial response containing the requested information not in the beacon and indicate the remaining subset of information is in the beacon. In yet another alternative example, the AP may determine information requested by a STA is in the beacon. However, the AP may still transmit the information requested in a GAS initial response because the AP determines the request is urgent or the requesting STA is a legacy STA (i.e., the requesting STA is not capable of reading ANQP information from a beacon). A more detailed description of a general scheme of multicasting ANQP elements may be found in commonly assigned U.S. Provisional Application No. 61/723,266, filed Nov. 6, 2012, entitled "Adaptive Access Network Query Protocol (ANQP) Information Provisioning in Wireless Fidelity (Wi-Fi) Beacons", which application is hereby incorporated herein by reference.

Figure 3:
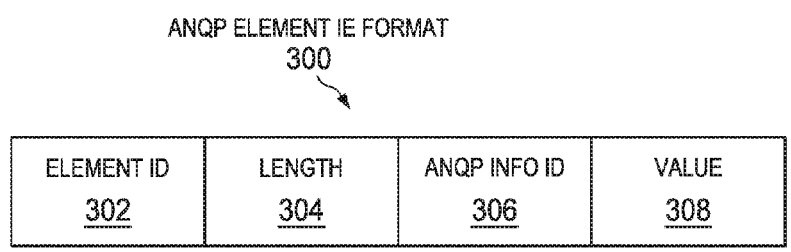
FIG. 3 is a block diagram of adaptive network query protocol (ANQP) element information element (IE) format in accordance with various embodiments.

The inclusion of an ANQP IEs in a management frame by an AP and received by an STA may be formatted in conformance with a standard. For example, various parameters and reference tables related to IEs may be found in the standard, IEEE 802.11-2012, Part 11: Wireless LAN Medium Access Control (MAC) and Physical Layer (PHY) Specifications, which is incorporated herein by reference in its entirety. FIG. 3 illustrates one format 300 of an ANQP IE in accordance with various embodiments. Format 300 is an ANQP element IE format that an AP may use to multicast ANQP elements, for example, in a beacon broadcast. ANQP element IE format 300 includes element ID field 302, length field 304, ANQP Info ID field 306, and value field 308.

Element ID field 302 is one-octet (i.e., eight bits) in length and allows a STA to identify the IE as an ANQP element IE. The value of element ID field 302 may be set in an IE element ID table of an applicable standard (e.g., Table 8-54ai of IEEE 802.11). The value of element ID field 302 may be constant across all ANQP element IEs. Length field 304 is a one-octet field that specifies the length of value field 308 in octets.

ANQP info ID field 306 is a one-octet field that identifies the type of information in the value field 308. That is, ANQP info ID field 306 indicates to the receiving STA what genre of information value field 308 contains (e.g., operator identity, AP location, or the like). The value of ANQP info ID field 306 may be set by an applicable table in standard. For example, the value of ANQP info ID field 306 may be derived from Table 8-184 in IEEE 802.11, portions of which are reproduced in FIG. 4 for reference. Particularly, the value of ANQP info ID field 306 may be set as the value in InfoID column 400 corresponding to the appropriate ANQP-element name column 402 (e.g., value 261 would indicate the ANQP element IE contained roaming consortium information). FIG. 4 shows a portion of IEEE 802.11 Table 8-184 for illustrative purposes only. The values of and corresponding types of information covered by ANQP IEs may vary and change based on the configuration of a network and relevant standards.

Value field 308 is a field of variable length that contains the substantive information of the ANQP element IE. Thus, ANQP element IE format 300 is a container for an AP to include ANQP elements in an appropriate format to be included in a beacon broadcast or probe response according to various embodiments.

Figures 5, 6, 7:
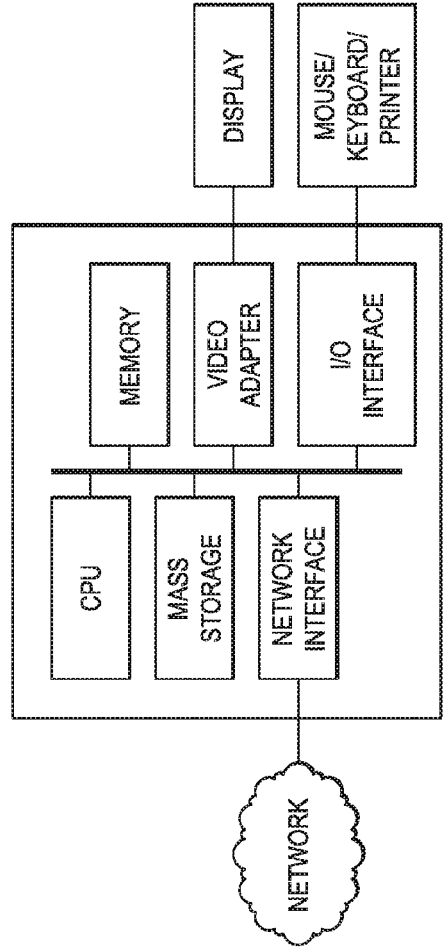
FIGS. 5-6 are block diagrams of ANQP list IE formats in accordance with various embodiments.
FIG. 7 is a block diagram illustrating a computing platform that may be used for implementing, for example, the devices and methods described herein, in accordance with an embodiment.

In alternative embodiments, the ANQP information may be fragmented and transmitted over multiple IEs in a beacon. Fragmentation may be necessary because an IE may be limited to a maximum size by an IE size limit standard. For example, in IEEE 802.11, an IE format has a maximum size of 256 bits. Therefore, if the ANQP information an AP desires multicast exceeds this maximum size limitation, it may be fragmented and transmitted as multiple ANQP list IEs. FIG. 5 illustrates an example format 500 of ANQP list IEs. Format 500 allows for the transmission of a group of ANQP list IEs 502, which collectively contains the information of the requested ANQP information. ANQP list IEs 502 are sized to be within the maximum size limitations of an IE.

Format 500 includes an element ID field 504, a length field 506, ANQP info ID fields 508, ANQP fragment fields 510, ANQP length fields 512, and ANQP value fields 514. Element ID field 504 is a one-octet field that identifies the IE as an ANQP list IE, and its value may be set in accordance with a standard. For example, element ID field 504's value may be set by element ID table 8-54ai in IEEE 802.11. Element ID field 504 may have a different value than element ID field 302 so that a STA may distinguish between an ANQP list IE and an ANQP element IE. Length field 506 is a one-octet field that specifies, in octets, the total length of the ANQP list IE.

ANQP info ID fields 508, ANQP length fields 512, and ANQP value fields 514 collectively identify the type and substantive content of information contained the in each ANQP list IE 502, which collectively form an ANQP list IE. ANQP info ID fields 508, ANQP length fields 512, and ANQP value fields 514 may be substantially similar to corresponding length field 304, ANQP info ID field 306, and ANQP value field 308 of ANQP element IE format 300.

ANQP fragment field 510 is a one-octet field and may be formatted in accordance with format 600 of FIG. 6. End fragment bit 602 is one bit that indicates if the applicable ANPQ list IE 502 is the last fragment of the group (e.g., if end fragment is set to 0) or if another ANQP list IE follows (e.g., if end fragment is set to 1). The fragment sequence number bits 604 are seven bits in length and indicate the sequence number of the applicable ANQP list IE 502. Thus, an ANQP element may be fragmented and transmitted as a group of multiple ANQP list IEs, and the capability of ANQP transmissions in a multicast is not constrained by the IE size limitations.

Various embodiments advantageously reduce the amount of GAS messaging required when particular IE(s) are requested frequently. By controlling which IE(s) will be broadcasted and the timing of the broadcasts, an AP can control and conserve both air-interface and backhaul traffic loads. The formatting of ANQP element IEs and ANQP list IEs enable an AP to broadcast ANQP elements through for example, its beacon.

FIG. 7 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not shown) may be used to provide a serial interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for access network query protocol (ANQP) signaling comprising:
   receiving, by an access point (AP), a request for ANQP information from a station (STA);
   determining, by the AP, a first portion of the ANQP information was requested by a number of ANQP information requests within a timeframe, wherein the number of ANQP information requests exceeds a threshold;
   caching, by the AP, the first portion of ANQP information for transmission in a multicast;
   multicasting, by the AP, the first portion of the ANQP information as an ANQP information element (IE), wherein the ANQP IE is configured in accordance with a format transmittable by the AP in the multicast; and
   unicasting, by the AP, a second portion of the ANQP information to the STA.

2. The method of claim 1, wherein multicasting the first portion of the ANQP information comprises using a beacon broadcast of the AP or a probe query/response protocol of the AP.

3. The method of claim 1, wherein unicasting the second portion of the ANQP information comprises unicasting the second portion of the ANQP information in a generic advertisement service (GAS) response.

4. The method of claim 1, wherein multicasting the first portion of the ANQP information comprises multicasting each ANQP element of the first portion of the ANQP information as a single ANQP element information element (IE).

5. The method of claim 1, wherein multicasting the first portion of the ANQP information comprises multicasting each ANQP element of the first portion of the ANQP information as a plurality ANQP list information elements (IEs).

6. The method of claim 1, wherein the format transmittable by the AP in a multicast is configured in conformance with a standard.

7. An access point (AP) comprising:
   a processor; and
   a non-transitory computer readable storage medium storing programming for execution by the processor, the programming including instructions to:
      receive, by the AP, a request for adaptive network query protocol (ANQP) information from a station (STA);
      determine, by the AP, a first portion of the ANQP information was requested by a number of ANQP information requests within a timeframe, wherein the number of ANQP information requests exceeds a threshold;
      cache, by the AP, the first portion of ANQP information for transmission in a multicast;
      format, by the AP, first ANQP elements corresponding to the first portion of the ANQP information requested by the STA as one or more ANQP information elements (IEs), wherein the ANQP IEs are configured in a multicast format;
      include, by the AP, the one or more ANQP IEs in the multicast; and
      unicast, by the AP, second ANQP elements corresponding to a second portion of the ANQP information requested by the STA to the STA.

8. The AP of claim 7, the instructions to format the first ANQP elements comprises instructions to format at least one of the first ANQP elements as an ANQP element IE comprising an element ID field allowing the STA to identify the ANQP element IE as an ANQP element IE, a length field indicating a length of an ANQP value field, an ANQP info ID field indicating a type of information contained in the ANQP value field, the ANQP value field, or a combination thereof.

9. The AP of claim 7, wherein the instructions to format the first ANQP elements comprises instructions to format at least one of the first ANQP elements as a plurality of ANQP list IEs each comprising a ANQP fragment field, wherein the ANQP fragment field indicates whether an ANQP list IE is a last ANQP list IE in the plurality of ANQP list IEs.

10. The AP of claim 7, wherein the programming further comprises instructions to remove the ANQP IEs from the multicast in accordance with an expiration of a timer, traffic load, number of associated STAs, time of day, operator policy, or a combination thereof.

11. The AP of claim 7, wherein the programming further comprises instructions pull the ANQP information requested by the STA from a server as a plurality of ANQP elements.

12. The AP of claim 11, wherein the programming further comprises instructions to receive an indication from a server regarding which ones of the plurality of ANQP elements to include in the multicast.

13. The AP of claim 7, wherein the programming includes further instructions to transmit an indicator to the STA, wherein the indicator indicates the first portion of the ANQP information is included in the multicast.

14. The AP of claim 7, wherein the programming includes further instructions to format the second ANQP elements in a different format that the first ANQP elements.

15. A station (STA) comprising:
   a processor; and
   a non-transitory computer readable storage medium storing programming for execution by the processor, the programming including instructions to:
      transmit a request for adaptive network query protocol (ANQP) information;
      receive, from an access point, a first portion of the ANQP information as one or more ANQP information elements (IEs) in a multicast;
      receive, from the access point, a second portion of the ANQP information as one or more ANQP elements, wherein the one or more ANQP elements is in a different format than the ANQP IEs; and
      receive, from the access point, a subsequent multicast from which the one or more ANQP IEs were removed in accordance with an expiration of a timer, traffic load, number of associated STAs, time of day, operator policy, or a combination thereof.

16. The STA of claim 15, wherein the instructions to receive the second portion of ANQP information comprises receiving the second portion of the ANQP information in a generic advertisement service (GAS) unicast.

17. The STA of claim 15, wherein the instructions to receive the one or more ANQP IEs comprise instructions to receive an ANQP element IE, a plurality of ANQP list IEs, or a combination thereof.

18. The STA of claim 15, wherein the instructions to transmit a request for ANQP information includes instructions to use a generic advertisement service (GAS) protocol of an access point.

19. A method for adaptive network query protocol (ANQP) signaling comprising:
- transmitting, by a station (STA), a request for ANQP information;
- receiving, by the STA from an access point, a first portion of the requested ANQP information as one or more ANQP information elements (IEs) in a multicast;
- receiving, by the STA from the access point, a second portion of the requested ANQP information as one or more ANQP elements in a unicast, wherein the one or more ANQP IEs is in a different format than the ANQP elements; and
- receiving, by the STA from the access point, a subsequent multicast from which the one or more ANQP IEs were removed in accordance with an expiration of a timer, traffic load, number of associated STAs, time of day, operator policy, or a combination thereof.

* * * * *